(12) United States Patent
Chandra-Ramadugu et al.

(10) Patent No.: US 9,926,827 B2
(45) Date of Patent: Mar. 27, 2018

(54) DETECTION OF AN IMPROPER REDUCTANT IN A STORAGE TANK

(71) Applicant: Cummins Emission Solutions, Inc., Columbus, IN (US)

(72) Inventors: Jaya Chandra-Ramadugu, Columbus, IN (US); Farshad Farid, Indianapolis, IN (US); Kwadwo O. Owusu, Greenwood, IN (US); Sergio Manuel Hernandez-Gonzalez, Greenwood, IN (US); Joshua Supplee, Plain City, OH (US); Andrew Hillery, Bloomington, IN (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 129 days.

(21) Appl. No.: 14/702,248

(22) Filed: May 1, 2015

(65) Prior Publication Data
US 2016/0319725 A1   Nov. 3, 2016

(51) Int. Cl.
*F01N 9/00* (2006.01)
*F01N 3/20* (2006.01)
*F01N 11/00* (2006.01)

(52) U.S. Cl.
CPC .......... *F01N 9/007* (2013.01); *F01N 3/2066* (2013.01); *F01N 11/00* (2013.01); *F01N 11/007* (2013.01); *F01N 2550/02* (2013.01); *F01N 2560/021* (2013.01); *F01N 2560/025* (2013.01); *F01N 2560/026* (2013.01); *F01N 2610/02* (2013.01); *F01N 2900/1402* (2013.01); *F01N 2900/1616* (2013.01); *F01N 2900/1621* (2013.01); *Y02T 10/24* (2013.01); *Y02T 10/47* (2013.01)

(58) Field of Classification Search
CPC .......... Y02T 10/24; Y02T 10/47; F01N 3/208; F01N 2610/02; F01N 9/007; F01N 11/00; F01N 11/007; F01N 3/2066
See application file for complete search history.

(56) References Cited

U.S. PATENT DOCUMENTS

| | | |
|---|---|---|
| 6,805,095 B2 | 10/2004 | Sun et al. |
| 7,610,750 B2 | 11/2009 | Viola et al. |
| 7,712,203 B2 | 5/2010 | Toyoda |
| 8,034,291 B2 | 10/2011 | Qi et al. |
| 8,056,323 B2 | 11/2011 | Oosumi |
| 8,116,961 B2 | 2/2012 | Bogema et al. |
| 8,479,500 B2 | 7/2013 | Ren et al. |

(Continued)

*Primary Examiner* — Sizo Vilakazi
(74) *Attorney, Agent, or Firm* — Foley & Lardner LLP

(57) ABSTRACT

An aftertreatment system comprises an exhaust reductant storage tank and a SCR system including a catalyst fluidly coupled thereto. The aftertreatment system also includes a controller configured to interpret an output signal indicative of a catalytic efficiency of the catalyst. The output signal is filtered using a fast filter to obtain a fast filter response signal, and also using a slow filter to obtain a slow filter response signal. It is determined if the fast filter response signal exceeds a first threshold and if the slow filter response signal exceeds a second threshold. In response to determining that the fast filter response signal exceeds the first threshold, and the slow filter signal response exceeds the second threshold, an indication is provided that an improper exhaust reductant is present in the storage tank.

29 Claims, 10 Drawing Sheets

(56) References Cited

U.S. PATENT DOCUMENTS

| | | |
|---|---|---|
| 8,495,862 B2 | 7/2013 | Levijoki et al. |
| 9,010,087 B1 | 4/2015 | Upadhyay et al. |
| 9,021,787 B2 | 5/2015 | Yan et al. |
| 2010/0024397 A1* | 2/2010 | Chi ................. F01N 3/106 60/285 |
| 2011/0219746 A1* | 9/2011 | Yezerets ............ F01N 3/035 60/274 |
| 2012/0118059 A1* | 5/2012 | Reimer ............. F01N 3/2066 73/290 V |
| 2014/0033683 A1 | 2/2014 | Wei et al. |
| 2014/0053814 A1 | 2/2014 | Fisher et al. |
| 2014/0132951 A1* | 5/2014 | Georis .............. F01N 11/00 356/72 |
| 2014/0196521 A1 | 7/2014 | Basu |
| 2014/0311428 A1* | 10/2014 | Miyagawa .......... F02B 43/10 123/3 |
| 2015/0033705 A1* | 2/2015 | Anilovich .......... F01N 11/00 60/274 |
| 2017/0074191 A1* | 3/2017 | Kim ................. F02D 41/0275 |

* cited by examiner

DETECTION OF AN IMPROPER REDUCTANT IN A STORAGE TANK

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$). Generally in such conventional aftertreatment systems, an exhaust reductant, (e.g., a diesel exhaust fluid such as urea) is injected into the aftertreatment system to provide a source of ammonia, and mixed with the exhaust gas to partially reduce the NOx gases. The reduction byproducts of the exhaust gas are then fluidically communicated to the catalyst included in the SCR aftertreatment system to decompose substantially all of the NOx gases into relatively harmless byproducts which are expelled out of such conventional SCR aftertreatment systems.

An exhaust reductant is generally inserted into SCR system as the source of ammonia to facilitate the reduction of constituents of the exhaust gas (e.g., a diesel exhaust gas). The exhaust reductant is stored in a reductant storage tank and communicated to the SCR system. Presence of an improper reductant in the storage tank (e.g., an incorrect reductant, or an incorrect concentration of an exhaust reductant such as urea in an aqueous solution) negatively impacts the SCR catalyst catalytic conversion efficiency. However, catalytic conversion efficiency is also negatively impact by a degraded catalyst.

In conventional aftertreatment systems, an exhaust reductant storage tank level sensor that detects a sudden change in the level of the exhaust reductant is generally also used to indicate the presence of an improper reductant in the exhaust reductant storage tank. However, the tank level sensor provides an inaccurate assessment of the exhaust reductant. Thus, reduction of SCR catalytic conversion efficiency due to improper reductant is often inaccurately attributed to degradation of the catalyst of the SCR system. Replacing the catalyst is substantially more expensive than replacing the improper reductant. Therefore, incorrect diagnosis leads to unnecessary maintenance expenses substantially driving up the cost for maintaining aftertreatment systems.

SUMMARY

Embodiments described herein relate generally to systems and methods for detecting an improper reductant in an exhaust reductant storage tank, and in particular to methods of interpreting and filtering an output signal indicative of a catalytic efficiency of a catalyst included in an SCR system to determine the presence of the improper reductant.

In a first set of embodiments, an aftertreatment system comprises an exhaust reductant storage tank. A SCR system is fluidly coupled to the exhaust reductant storage tank. The SCR system includes at least one catalyst. The aftertreatment system also includes a controller configured to interpret an output signal indicative of a catalytic efficiency of the catalyst. The output signal is filtered using a fast filter to obtain a fast filter response signal. Furthermore, the output signal is filtered using a slow filter to obtain a slow filter response signal. The controller determines if the fast filter response signal exceeds a first threshold. The controller also determines if the slow filter response signal exceeds a second threshold. In response to a determination that the fast filter response signal exceeds the first threshold, and the slow filter signal response exceeds the second threshold, an indication is provided that an improper exhaust reductant is present in the exhaust reductant storage tank.

In another set of embodiments, a control module comprises a receiving module configured to receive an output signal indicative of a catalytic efficiency of a catalyst of a SCR system included in an aftertreatment system. A first filter module is configured to filter the output signal using a first filter and generate a first filter response signal. A second filter module is configured to separately filter the output signal using a second filter and generate a second filter response signal, the second filter having a distinct response time from the first filter. A determination module is configured to interpret the first filter response to determine if the first filter response signal exceeds a first threshold. Furthermore, the determination module interprets the second filter response signal to determine if the second filter response signal exceeds a second threshold. In response to the first filter response signal exceeding the first threshold and the second filter response signal exceeding the second threshold, it is indicated that an improper reductant is inserted into the SCR system.

In yet another set of embodiments, a non-transitory computer readable medium for identifying the presence of an improper exhaust reductant in an exhaust reductant storage tank fluidly coupled to a SCR system of an aftertreatment system, has instructions stored thereon that, when executed by a computing device, causes the computing device to perform operations comprising interpreting an output signal indicative of a catalytic efficiency of a catalyst included in the SCR system. The output signal is filtered using a first filter to obtain a first filter response signal. The output signal is also filtered using a second filter to obtain a second filter response signal, the second filter having a distinct response time from the first filter. The first filter response signal is interpreted to determine if the first filter response signal exceeds a first threshold. The second filter response signal is also interpreted to determine if the second filter response signal exceeds a second threshold. In response to the first filter response signal exceeding the first threshold and the second filter response signal exceeding the second threshold, it is indicated that an improper reductant is stored in the exhaust reductant storage tank.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
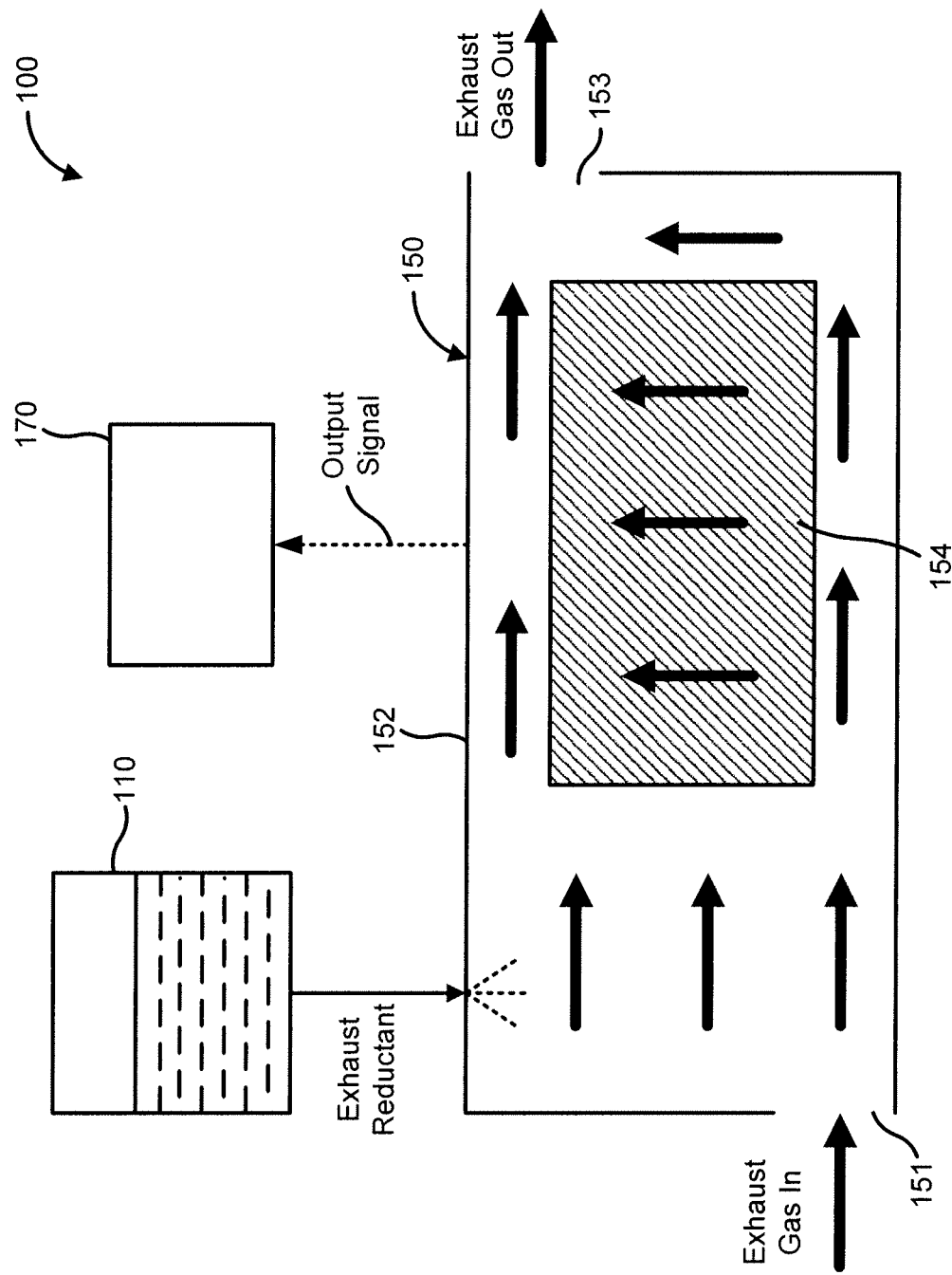
FIG. 1 is a schematic block diagram of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for detecting an improper reductant in an exhaust reductant storage tank, and in particular to methods of interpreting and filtering an output signal indicative of a catalytic efficiency of a catalyst included in an SCR system to determine the presence of the improper reductant.

Various embodiments of the systems and methods for detecting an improper reductant described herein may provide numerous benefits including, for example: (1) providing an accurate indication of the presence of an improper reductant in an exhaust reductant storage tank; (2) interpreting an output signal indicative of a catalytic efficiency of a catalyst to determine the presence of the improper reductant; (3) relatively simple integration with conventional on board diagnostic systems without significant modifications; and (4) preventing incorrect diagnosis of improper reductant inserted into the SCR system, as a failure of the catalyst of the SCR system thereby, reducing maintenance costs.

FIG. 1 is a schematic illustration of an aftertreatment system 100, according to an embodiment. The aftertreatment system 100 is configured to receive an exhaust gas (e.g., a diesel exhaust gas) from an engine (e.g., a diesel engine) and reduce constituents of the exhaust gas such as, for example, NOx gases, CO, etc. The aftertreatment system 100 includes an exhaust reductant storage tank 110, an SCR system 150, and a controller 170.

The storage tank 110 contains an exhaust reductant formulated to facilitate reduction of the constituents of the exhaust gas (e.g., NOx) by a catalyst 154 included in the SCR system 150. In embodiments in which the exhaust gas is a diesel exhaust gas, the exhaust reductant can include a diesel exhaust fluid (DEF) which provides a source of ammonia. Suitable DEFs can include urea, aqueous solution of urea or any other DEF (e.g., the DEF available under the trademark ADBLUE®).

The SCR system 150 is configured to receive and treat the exhaust gas (e.g., a diesel exhaust gas) flowing through the SCR system 150. The SCR system 150 is fluidly coupled to the storage tank 110 to receive the exhaust reductant from the storage tank 110. The SCR system 150 includes a housing 152 defining an inlet 151 for receiving the exhaust gas from an engine, and an outlet 153 for expelling treated exhaust gas. The SCR system 150 includes at least one catalyst 154 positioned within an internal volume defined by the housing 152. The catalyst 154 is formulated to selectively reduce constituents of the exhaust gas, for example, NOx included in the exhaust gas in the presence of an exhaust reductant. Any suitable catalyst 154 can be used such as, for example, platinum, palladium, rhodium, cerium, iron, manganese, copper, vanadium based catalysts (including combinations thereof).

The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials can include, for example, aluminum oxide, titanium dioxide, silicon dioxide, any other suitable washcoat material, or a combination thereof. The exhaust gas can flow over and about the catalyst 154 such that any NOx gases included in the exhaust gas are further reduced to yield an exhaust gas which is substantially free of carbon monoxide (CO) and NOx gases.

Figure 2:
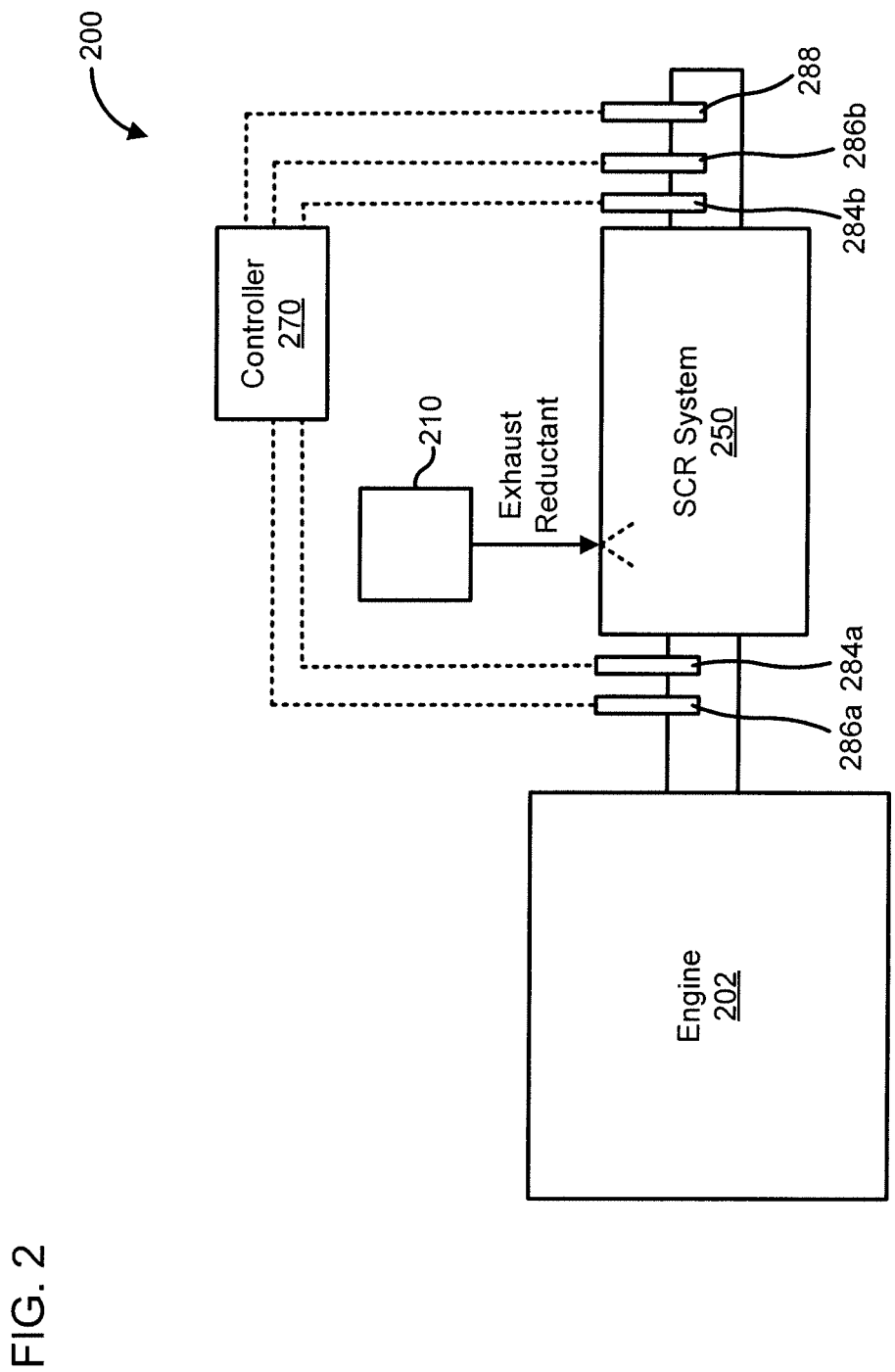
FIG. 2 is a schematic block diagram of another embodiment of an aftertreatment system which is coupled to an engine and configured to receive an exhaust gas from the engine.

The controller 170 is configured interpret an output signal indicative of a catalytic efficiency of the catalyst. The output signal can include, for example a current or a voltage, and can be digital or analog. The output signal can comprise signals generated by one or more sensors (e.g., oxygen sensors, NOx sensors, ammonia sensors, etc.) included in the aftertreatment system 100, as described in detail herein with respect to the aftertreatment system 200 (FIG. 2).

The controller 170 is configured to filter the output signal using a first filter to obtain a first filter response signal. In particular embodiments, the first filter comprises a fast filter which produces a fast filter response signal. The fast filter can include any suitable filter which responds rapidly to change in the output signal of the catalytic efficiency sensor which is input into the fast filter. In other words, the fast filter is heavily weighted towards the output signal (e.g., current) input into the fast filter relative to the FFR signal which is output from the fast filter. Suitable fast filters which can be used by the controller 170 include, for example, any filter with a relatively small time constant compared to that of the slow filter or a filter that is weighted more heavily on the input signal. In one embodiment, the fast filter can have a time constant in the range of 10 milliseconds to 800 milliseconds (e.g., 10, 15, 20, 25, 30, 35, 40, 50, 60, 70, 80, 90, 100, 200 . . . milliseconds inclusive of all ranges and values therebetween). In another embodiment, the fast filter can have a time constant in the range of 1 second to 90 seconds.

The controller 170 is also configured to filter the output signal using a second filter to obtain a second filter response signal. The second filter has a distinct response time from the first filter. In particular embodiments, the second filter comprises a slow filter which produces a slow filter response signal. The slow filter responds relatively slowly to the output signal. The slow filter is weighted towards slow filter response signal relative to the output signal input into the slow filter. In one embodiment, the slow filter can have a time constant in the range of 30 milliseconds to 1000 milliseconds (e.g., 30, 40, 50, 60, 70, 80, 90, 100, 200, 300, 400, 500, 600, 700, 800, 900 or 1000 milliseconds inclusive of all ranges and values therebetween). In another embodiment, the slow filter can have a time constant in the range of 2 seconds to 100 seconds.

In still another embodiment, the slow filter can include an exponential weighted moving average. In this situation, the filter may be weighted more heavily on the previous output than the present input signal. For example, using a first order such as $A*X(k)+(1-A)*Y(k-1)=Y(k)$, where A is the weight, $X(k)$ is the present input signal, $Y(k-1)$ is the past output signal, $Y(k)$ is the present output signal. If the fast filter A is in the range 1 to 0.2, then the slow filter is in the range 0.9 to 0.1.

In yet another embodiment, a ratio between the response time of the fast filter and the slow filter can be in the range of 1:1.1 to 1:10 (e.g., 1:1, 2:1, 3:1, 4:1, 5:1, 6:1, 7:1, 8:1, 9:1 or 10:1 inclusive of all ratios therebetween). In one particular embodiment, the ratio between the fast filter and the slow filter is 6:1.

The controller 170 determines if the first filter response signal exceeds a first threshold. The controller 170 also determines if the second filter response signal exceeds a second threshold. In response to the first filter response signal exceeding the first threshold and the second filter response signal exceeding the second threshold, the controller 170 provides an indication that an improper exhaust reductant is present in the storage tank 110. In particular embodiments, the indication can include generating a fault code indicative of the presence of improper reductant in the storage tank 110. The fault code can be stored on a CRM accessible by a user, for example a memory included in an onboard computing device (e.g., the computing device 430 described herein) or the controller 170 which can be accessible by a user on demand. In other embodiments, providing the indication includes lighting a malfunction indicator lamp (MIL). The MIL can, for example, be included in a dash board of a vehicle, control panel of an industrial equipment, control panel of generator set, or any other system which includes the aftertreatment system 100.

In other embodiments, in response to determining that the first filter response signal (e.g., a fast filter response signal) does not exceed the first threshold, and the second filter response signal (e.g., a slow filter response signal) exceeds the second threshold, the controller 170 is further configured to provide an indication that the catalyst 154 has failed. The indication can include generating a fault code or light a MIL as described above.

The controller 170 can include a processor (e.g., a microcontroller) programmed to interpret the output signal. In some embodiments, the controller 170 can be included in a control module (e.g., the control module 270 described herein) which is in electrical communication one or more of the components of the aftertreatment system 100 described herein and operable to perform the sensing and control functions described herein. In particular embodiments, the controller 170 can also be configured to receive and interpret data from, temperature sensors, NOx sensors, oxygen sensors and/or ammonia sensors, each of which can be included in the aftertreatment system 100.

The controller 170 can include look up tables, algorithms or instructions, which can be stored on a CRM included in the controller 170. The instructions or algorithms on the CRM are executable by a computing device (e.g., the computing device 430) of the controller 170 (e.g., the microprocessor) specifically programmed to interpret the first filter response signal and the second filter response signal to determine if an improper reductant is contained within the storage tank 100 and/or the catalyst 154 has failed. In particular embodiments, the controller 170 can also include algorithms or look up tables to compare the first filter response signal and the second filter response signal with the first threshold and the second threshold, respectively to determine if an improper reductant is present in the storage tank 110 and/or the catalyst 154 has failed.

In some embodiments, an aftertreatment system can include one or more sensors such as oxygen sensors, NOx sensor, ammonia sensors, etc. positioned upstream or downstream of an SCR system of the aftertreatment system. Signals from these sensors can be indicative of the catalytic efficiency of a catalyst of the SCR system. For example, FIG. 2 shows another embodiment of an aftertreatment system 200. The aftertreatment system 200 is configured to receive an exhaust gas (e.g., a diesel exhaust gas) from an engine 202 (e.g., a diesel exhaust engine) and reduce constituents of the exhaust gas.

The aftertreatment system 200 includes an SCR system 250 which can be substantially similar to the SCR system 150 and is not described in further detail herein. An exhaust reductant storage tank 210 is fluidly coupled to the SCR system 250 and configured to communicate an exhaust reductant into the SCR system, as described with respect to the storage tank 110 included in the aftertreatment system 100. The aftertreatment system 200 also includes a controller 270 which can be substantially similar to the controller 170 described before herein.

A first oxygen sensor 284a is positioned upstream of the SCR system 250. The first oxygen sensor 284a generates a first oxygen sensor signal indicating a concentration of oxygen in the exhaust gas upstream of the SCR system 250. A second oxygen sensor 284b is positioned downstream of the SCR system 250. The second oxygen sensor 284b generates a second oxygen sensor signal, which indicated a concentration of the oxygen in the exhaust gas stream downstream of the SCR system 250. The first oxygen sensor 284a and the second oxygen sensor 284b are in electrical communication with the controller 270.

In one embodiment, the controller 270 is configured to interpret the first oxygen sensor signal, interpret the second oxygen sensor signal and generate the output signal indicating the catalytic efficiency of at least one catalyst (e.g., the catalyst 154) included in the SCR system 250. The output signal is then used to determine the presence of an improper reductant in the storage tank 210 or a catalyst failure, as described before herein with respect to the aftertreatment system 100.

A first NOx sensor 286a is positioned upstream of the SCR system 250 and generates a first oxygen sensor signal indicating a concentration of NOx in the exhaust gas upstream of the SCR system 250. A second NOx sensor 286b is positioned downstream of the SCR system 250 and generates a second NOx sensor signal indicating a concentration of the NOx in the exhaust gas stream downstream of the SCR system 250. The first NOx sensor 286a and the second NOx sensor 286b are in electrical communication with the controller 270.

In another embodiment, the controller 270 is configured to interpret the first NOx sensor signal, interpret the second NOx sensor signal and generate the output signal indicating the catalytic efficiency of at least one catalyst (e.g., the catalyst 154) included in the SCR system 250. The output signal is then used to determine the presence of an improper reductant in the storage tank 210 or a catalyst failure, as described before herein.

Moreover, the aftertreatment system 200 also includes an ammonia sensor 288 positioned downstream of the SCR system 250 and configured to measure a concentration of the ammonia in the exhaust gas downstream of the SCR system 250. The ammonia sensor 288 is also in electrical communication with the controller 270. In yet another embodiment, an output signal of the ammonia sensor 288 is used to determine if an improper reductant is present in the exhaust storage stank 210 and/or the SCR system 250 catalyst has failed, as described before herein.

Each of the oxygen sensors 284a, 284b, the NOx sensors 286a, 286b and the ammonia sensor 288 can be in electrical communication with the controller 270 via separate communication circuitry (e.g., electrical leads) or via one type of communication circuitry which is configured to communicate with multiple components (e.g., a single wireless communication interface may be used to communicate wirelessly with multiple components).

Figure 3:
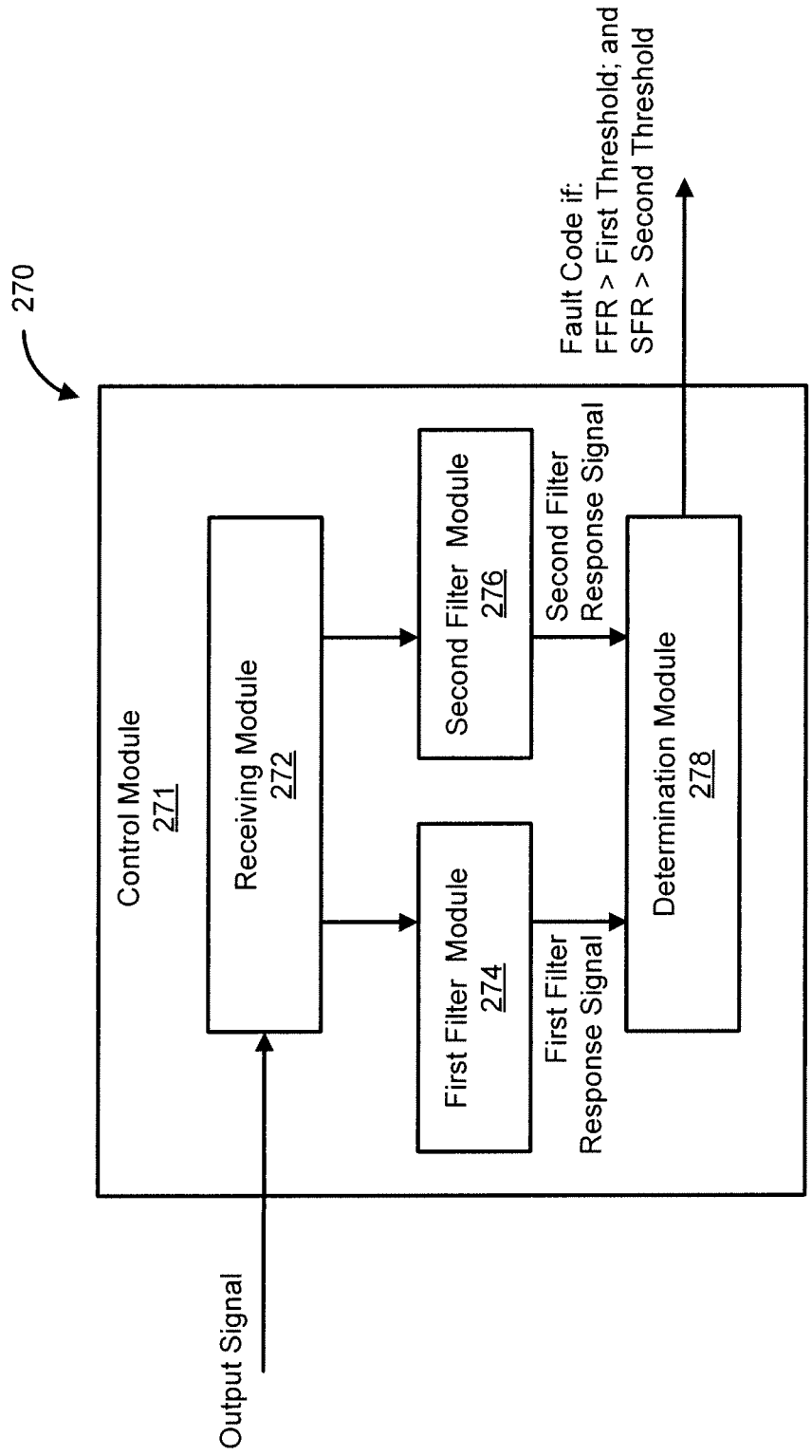
FIG. 3 is a schematic block diagram of one embodiment of a control module that can be included in an aftertreatment system.

In some embodiments, the controller 270 can be a system computer of an apparatus or system which includes the aftertreatment system 200 (e.g., a vehicle, generator set, etc.). Such a computer can include, for example the computing device 430 described in detail herein with respect to FIG. 10. In particular embodiments, the controller 270 can include a control module which is in electrical communication with one or more of the components of the aftertreatment system 200 described herein and operable to perform the sensing functions described herein. For example, FIG. 3 is a schematic block diagram of a control module 271 which can be included in the controller 270. The control module 271 includes a receiving module 272, a first filter module 274, a second filter module 276 and a determination module 278.

The receiving module 272 is configured to receive an output signal (e.g., an output signal of the oxygen sensors 284a and 284b, the NOx sensors 286a and 286b, or the ammonia sensor 288) which are indicative of a catalytic efficiency of a catalyst included in an SCR system (e.g., the SCR system 150 or 250).

The receiving module 272 communicates the output signal to each of the first filter module 274 and the slow filter module 276. The fast filter module 274 is configured to filter the output signal using a first filter and generate a first filter response signal. In particular embodiments, the first filter can include a fast filter, for example any of the fast filters described with respect to the aftertreatment system 100, and configured to produce a fast filter response signal.

Furthermore, the second filter is configured to separately filter the output signal using a second filter and generate a second filter response signal. The second filter has a distinct response time from the first filter. In particular embodiments, the second filter can include a slow filter, for example any of the slow filters described with respect to the aftertreatment system 100, and configured to produce a slow filter response signal.

The determination module 278 interprets the first filter response signal (e.g., a fast filter response signal) to determine if the first filter response signal exceeds a first threshold. The determination module also interprets the second filter response signal (e.g., a slow filter response signal) to determine if the second filter response signal exceeds a second threshold. Moreover, in response to the first filter response signal exceeding the first threshold and the second filter response signal exceeding the second threshold, the determination module indicates that an improper reductant is inserted into the SCR system 250. In various embodiments, the indicating can include generating a fault code indicative of the presence of an improper reductant in the storage tank 210. The fault code is stored on a CRM accessible by a user. In other embodiments, the indicating can include lighting a MIL as described before herein.

In yet another embodiment, the determination module 278 is further configured to determine a failure of the catalyst included in the SCR system 250 in response to the first filter response signal not exceeding the first threshold, and the second filter response signal exceeding the second threshold.

Figure 4:
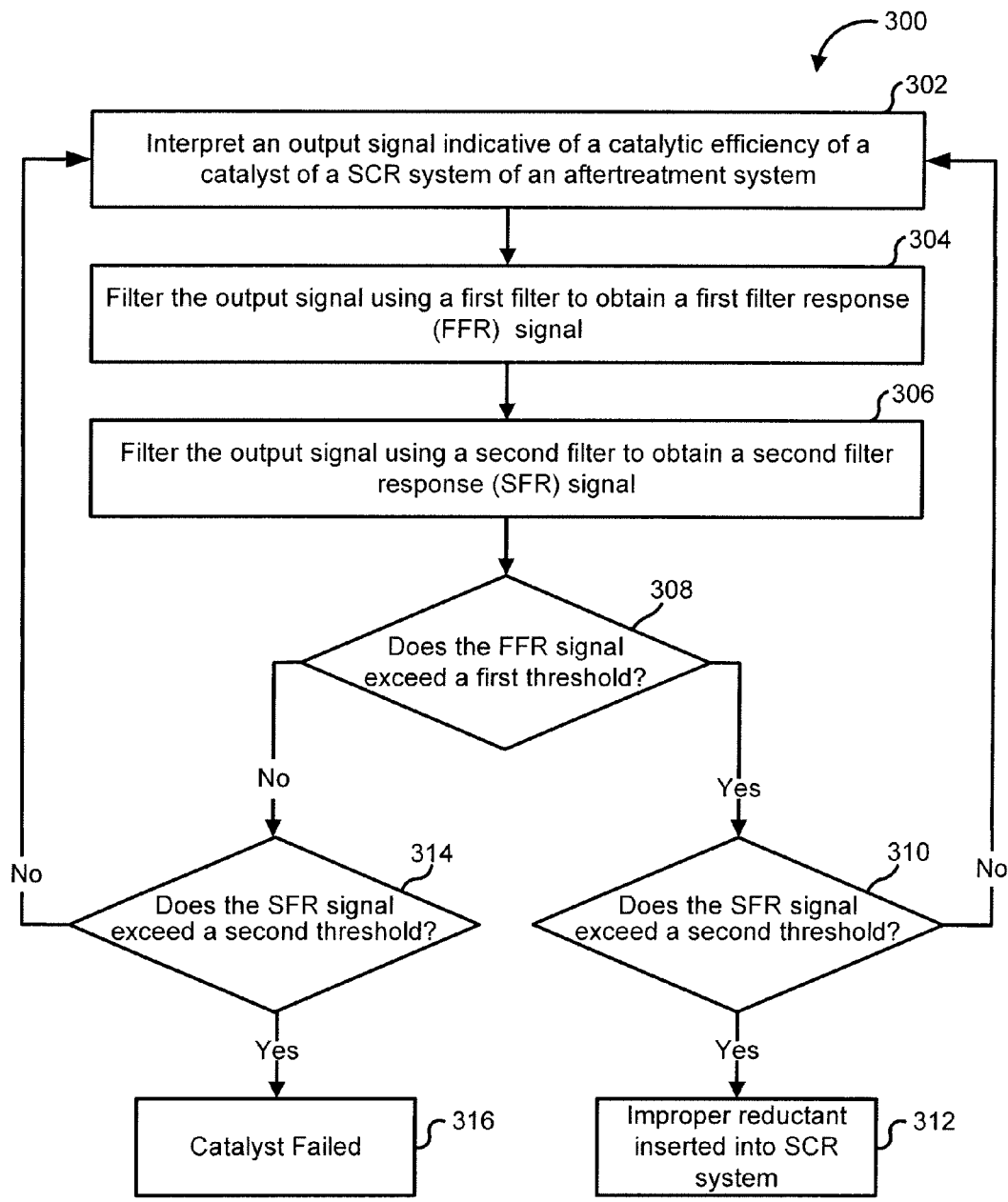
FIG. 4 is a schematic flow diagram of an embodiment of an exemplary method, implementable by a set of instructions which can be stored on a computer readable medium (CRM) and executable by a computing device, for detecting the presence of an improper reductant inserted into an SCR system.

FIG. 4 is a schematic flow diagram of an exemplary method 300 for indicating if an improper reductant is stored in an exhaust reductant tank fluidly coupled to a SCR system of an aftertreatment system. The operations of the method 400 can be stored in the form of instructions on a non-transitory CRM (e.g., the main memory 436, read only memory (ROM) 438 or storage device 440 included in the computing device 430 of FIG. 10). The CRM can be included in a computing device (e.g., the computing device 430) which is configured to execute the instructions stored on the CRM to perform the operations of the method 300.

The method 300 includes interpreting an output signal indicative of a catalytic efficiency of a catalyst of a SCR system of an aftertreatment system at 302. The output signal can include, for example, the first and second oxygen sensor signals generated by the first oxygen sensor 284a and the second oxygen sensor 284b respectively, the first and second NOx sensor signals generated by the first NOx sensor 286a and the second NOx sensor 286b, or the signal produced by the ammonia sensor 288. The output signal can be interpreted, for example by the receiving module 272 included in the control module 271. The SCR system can include the SCR system 150, 250 or any other SCR system described herein.

The output signal is filter using a first filter to obtain a first filter response (FFR) signal at 304. For example, the output signal can be filtered using the first filter by the first filter module 274 included in the control module 271. In particular embodiments, the first filter includes a fast filter which produces a fast filter response signal. The fast filter can include any suitable filter which responds rapidly to change in the output signal of the catalytic efficiency sensor which is input into the fast filter. In other words, the fast filter is heavily weighted towards the output signal (e.g., current) input into the fast filter relative to the FFR signal which is output from the fast filter. Suitable fast filters include, for example any filter with a relatively small time constant or a filter that is weighted more heavily on the input signal. In one embodiment, the fast filter can have a time constant in the range of 10 milliseconds to 800 milliseconds (e.g., 10, 15, 20, 25, 30, 35, 40, 50, 60, 70, 80, 90 or 800 milliseconds inclusive of all ranges and values therebetween). In another embodiment, the fast filter can have a time constant in the range of 1 second to 90 seconds.

The output signal is also filtered using a second filter to obtain a slow filter response (SFR) signal at 306. The second filter has a distinct response time from the first filter. For example, the output signal can be filtered using the second filter by the second filter module 276 included in the control module 271. In particular embodiments, the second filter includes a slow filter which produces a slow filter response signal. The slow filter responds relatively slowly to the output signal (compared to the response from the fast filter). The slow filter is weighted towards slow filter response signal relative to the output signal input into the slow filter. In one embodiment, the slow filter can have a time constant in the range of 30 milliseconds to 1000 milliseconds (e.g., 30, 40, 50, 60, 70, 80, 90, 100, 200, 300, 400, 500, 600, 700, 800, 900 or 1000 milliseconds inclusive of all ranges and values therebetween). In another embodiment, the slow filter can have a time constant in the range of 2 seconds to 100 seconds.

In another still embodiment, the slow filter can include an exponential weighted moving average. In this situation, the filter may be weighted more heavily on the previous output than the present input signal. For example, using a first order such as $A*X(k)+(1-A)*Y(k-1)=Y(k)$, where A is the weight, $X(k)$ is the present input signal, $Y(k-1)$ is the past output signal, $Y(k)$ is the present output signal. If the fast filter A is in the range 1 to 0.2, then the slow filter is in the range 0.9 to 0.1.

In yet another embodiment, a ratio between the response time of the fast filter and the slow filter can be in the range of 1.1:1 to 10:1 (e.g., 1:1, 2:1, 3:1, 4:1, 5:1, 6:1, 7:1, 8:1, 9:1 or 10:1 inclusive of all ratios therebetween). In one embodiment, a ratio between the fast filter and the slow filter is 6:1.

The method 300 interprets the FFR signal at 308 to determine if the FFR signal exceeds a first threshold. If the FFR signal exceeds the first threshold, the method determines at 310 if the SFR signal exceeds the second threshold. For example, the determination module 278 included in the control module 271 can be used to interpret the FFR signal and the SFR signal. The FFR signal and the SFR signal can be interpreted consecutively in any order or simultaneously. If the SFR signal also exceeds the second threshold, the method indicates that an improper reductant is stored in an exhaust reductant storage tank fluidly coupled to the SCR system at 312. However, if the SFR signal does not exceed the first threshold, the method returns to operation 302. The indicating can include, for example, generating a fault code indicative of the presence of an improper exhaust reductant in the exhaust reductant storage tank, and storing the fault code on a CRM, as described before herein. In one embodiment, the indicating can include lighting an MIL, as described before herein.

In contrast, if the FFR signal does not exceed the first threshold at operation 308, the method determines if the SFR signal exceeds the second threshold at 314. If the SFR signal exceeds the second threshold, the method 300 indicates that the catalyst included in the SCR system has failed. However, if the SFR signal does not exceed the second threshold, the method returns to operation 302.

Figure 5:
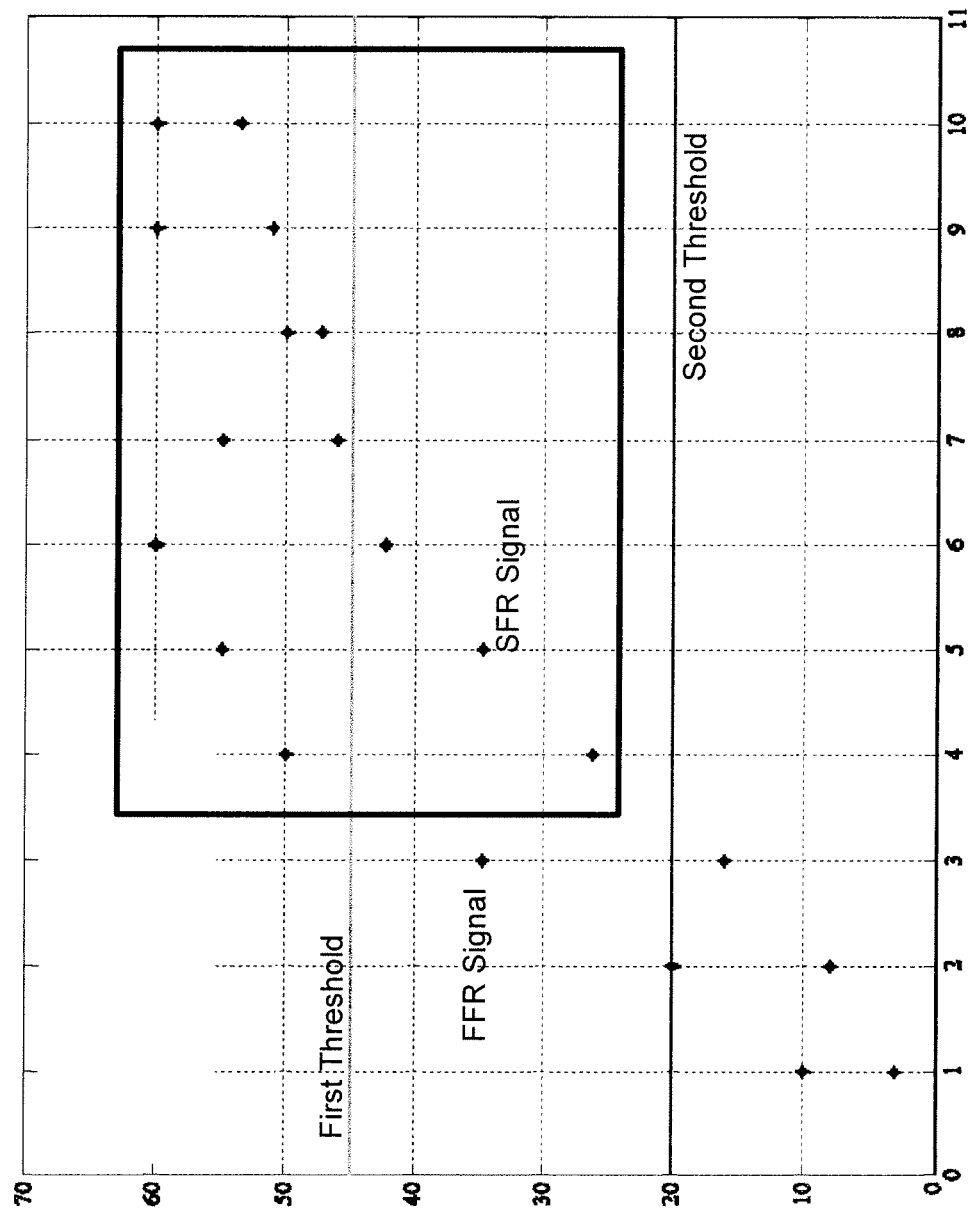
FIG. 5 is a scatter plot of an exemplary fast filter response (FFR) signal and slow filter response (SFR) signal in which an improper reductant is stored in an exhaust reductant tank and inserted into an SCR system.

FIG. 5 shows a scatter plot of depicting an exemplary fast filter response (FFR) signal and slow filter response (SFR) signal in response to an improper reductant present in an exhaust reductant storage tank (e.g., the storage tank 110 or 210). The first threshold and the second threshold are indicated by horizontal lines on the plot. The first threshold and the second threshold values can be stored in a CRM included in the controller 270 or in a computing device (e.g., the computing device 430) which can serve as the controller. As shown in FIG. 5 the FFR signal exceeds the first threshold and the SFR signal exceeds indicating that an improper reductant is present in the exhaust reductant storage tank.

Figure 6:
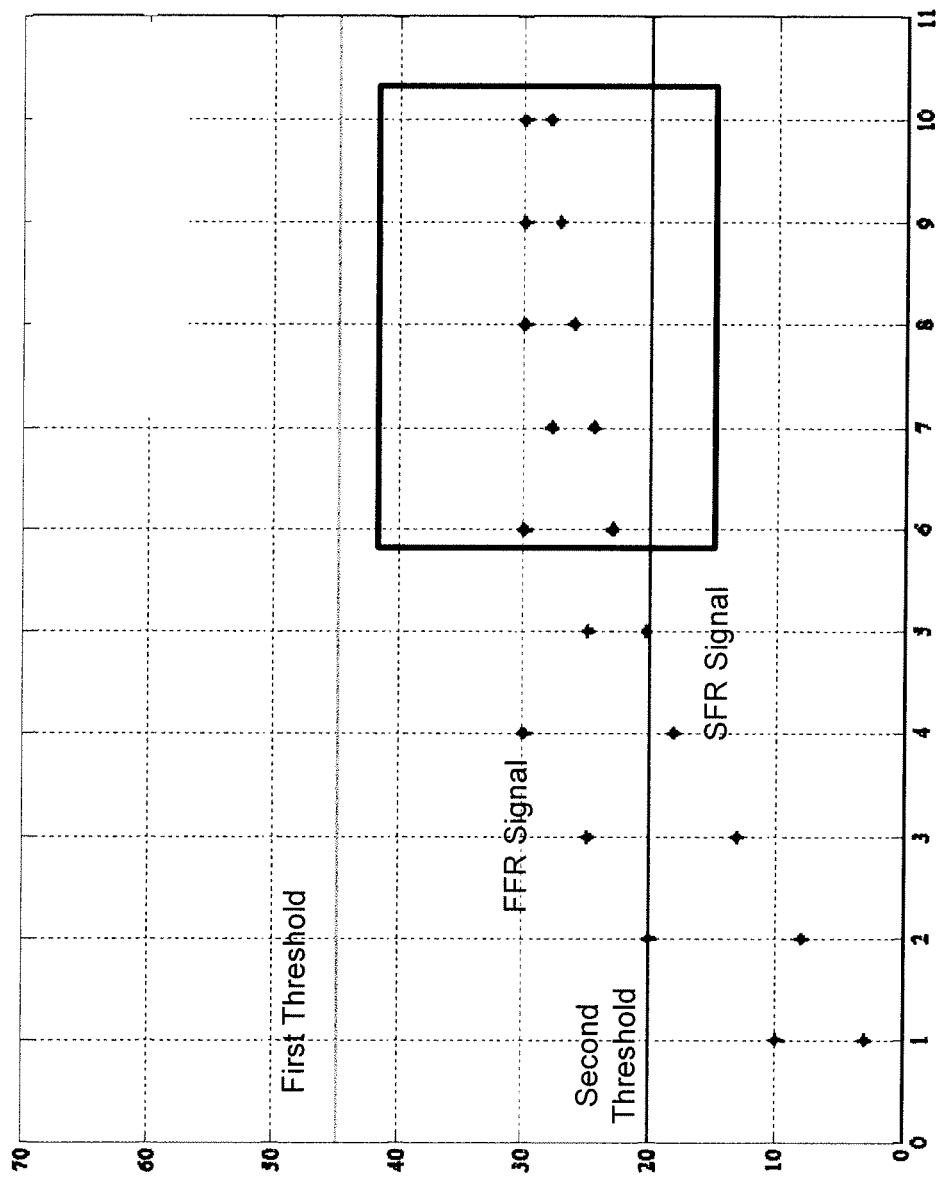
FIG. 6 is a scatter plot of another exemplary FFR signal and SFR signal in which the SCR catalyst has failed.

FIG. 6 shows another scatter plot depicting an exemplary FFR signal and SFR signal in response to a catalyst failure. The FFR signal does not exceed the first threshold but the SFR signal exceeds the second threshold indicating that the catalyst has failed.

Figure 7:
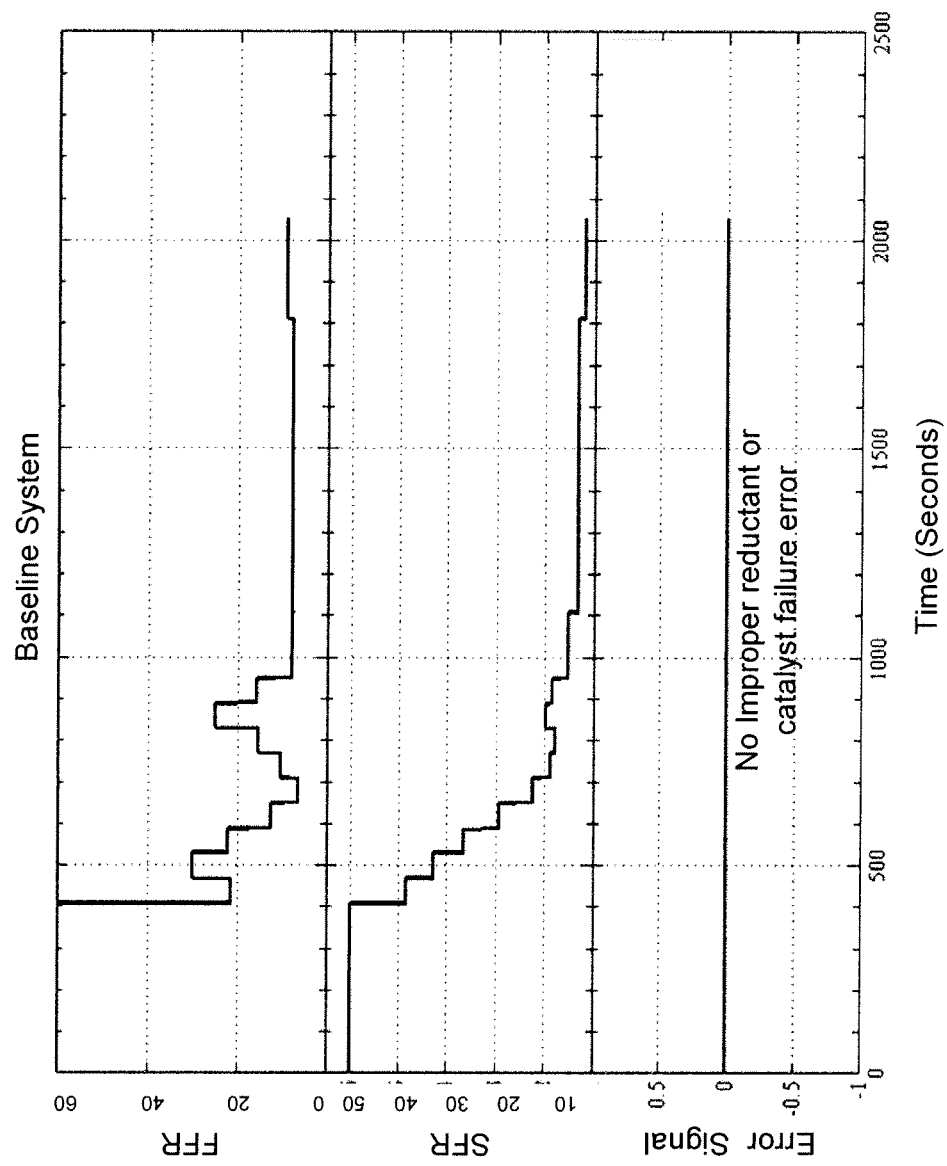
FIG. 7 is a real time plot of a FFR signal and a SFR signal obtained from an output signal from a catalytic conversion efficiency sensor in which a proper reductant is inserted into the SCR system and the SCR catalyst has not failed, and an error signal determined from the FFR signal and the SFR signal.
Figure 8:
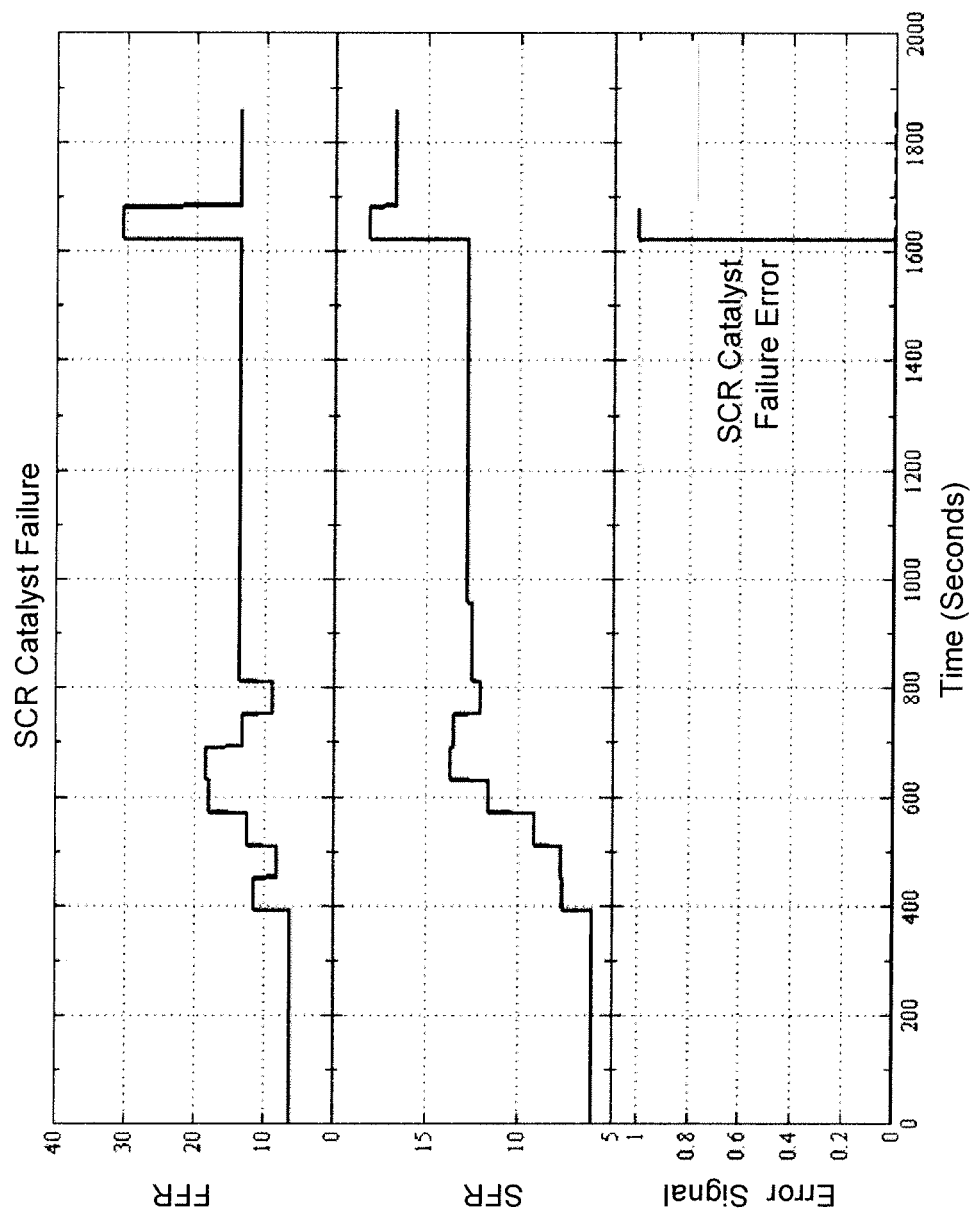
FIG. 8 is a real time plot of FFR signal and SFR signal obtained from an output signal from a catalytic conversion efficiency sensor in which the catalyst of the SCR system has failed, and an error signal determined from the FFR signal and the SFR signal.
Figure 9:
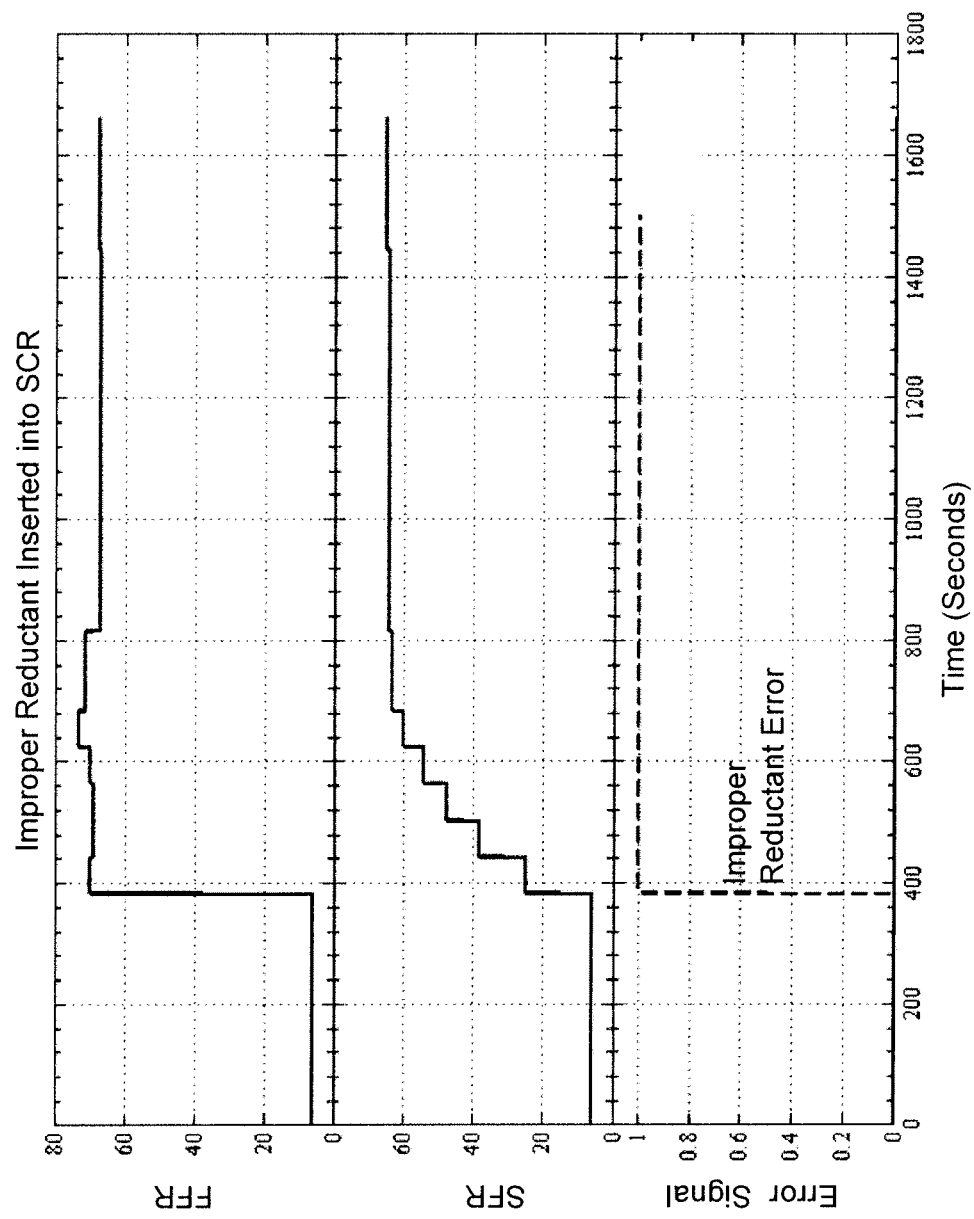
FIG. 9 is a real time plot of FFR signal and SFR signal obtained from an output signal from a catalytic conversion efficiency sensor in which an improper reductant is inserted into the SCR system, and an error signal determined from the FFR signal and the SFR signal.

FIG. 7-9 are real time plots of a fast filter response (FFR) signal and a slow filter response (SFR) signal obtained from a catalytic efficiency sensor (e.g., any of the catalytic efficiency sensors described herein) included an aftertreatment system (e.g., the aftertreatment system 100, 200 or any other aftertreatment system described herein). The fast filter has a first time constant of 22.2 milliseconds and the slow filter has a second time constant of 133.33 milliseconds. The FFR signal and SFR signal of FIG. 7 are representative of an aftertreatment system in which a proper exhaust reductant is stored in an exhaust storage tank and communicated to an SCR system, and a catalyst of the SCR system has not failed. The FFR and SFR signals of FIG. 8 are for an aftertreatment system in which a proper exhaust reductant is inserted into the SCR system but the SCR catalyst has failed. The FFR and SFR signals for FIG. 9 are for an aftertreatment system in which the SCR catalyst is functioning properly but an improper reductant is inserted into the SCR system. The plots of FIGS. 7-9 also include an error signal derived from the FFR signals and SFR signals which is configured to indicate presence of an improper reductant or catalyst failure.

As seen in FIG. 7 the FFR signal rapidly fluctuates without exceeding a first threshold and then settles to a steady state signal. The SFR signal fluctuates slowly without exceeding a second threshold and also settles to a steady state signal. The fluctuations are attributed to normal variations in sensor measurement upon initial insertion of the exhaust gas stream and the exhaust reductant in the aftertreatment system. The error signal does not vary from its baseline value as a proper reductant is inserted into the SCR system and the catalyst has not failed.

As seen in FIG. 8, the FFR signal settles to a baseline value. About 1,600 seconds after the start of exhaust gas flow into the aftertreatment system, the SCR system catalyst fails. This is recorded as a sharp increase in the FFR signal. The FFR signal however, does not exceed the first threshold (e.g., 50 on the Y axis of the FFR signal plot) and returns rapidly to the steady state value. In contrast, the SFR signal exceeds the second threshold (e.g., 15 on the Y-axis of the SFR signal plot) at the same time but unlike the FFR signal, stays above the second threshold. The error signal is then derived from the FFR signal and the SFR signal which indicates the failure of the SCR system catalyst.

Referring to FIG. 9, the FFR signal immediately increases to a level beyond the first threshold. The SFR signal also increases to a level beyond the second threshold but relatively slowly compared to the FFR signal. The error signal derived in this case indicates insertion of an improper reductant into the SCR system thereby, indicating that an improper reductant is stored in an exhaust reductant storage tank fluidly coupled to the SCR system.

This behavior of the FFR signals and FFR signals can also be understood from the manner in which insertion of an improper reductant into the SCR system impacts exhaust emissions relative to failure of an SCR catalyst. Insertion of an improper reductant into the SCR system as well as failure of the catalyst results in increase in NOx emissions. However, insertion of an improper reductant results in an immediate increase in NOx emissions as well as higher NOx emissions, while failure of the catalyst generally results in slow rise of NOx emissions and at a lower level compared to instances where an improper reductant is inserted. Therefore, the fast filter interprets the catalytic efficiency signal for the rapid increase in emissions caused by insertion of an improper exhaust reductant. The slow filter on the other hand targets the relatively slow increase in emissions which can be attributed to catalyst failure.

Figure 10:
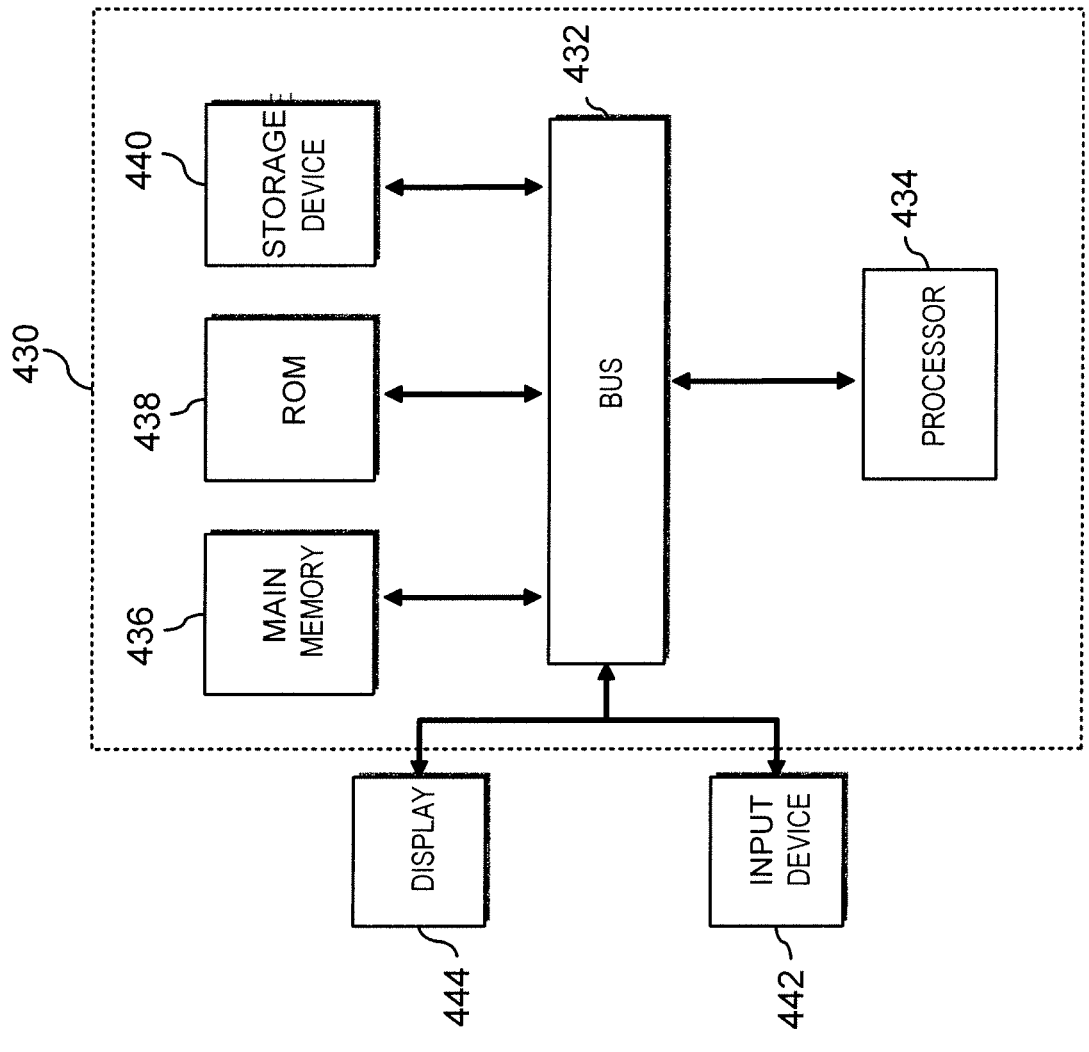
FIG. 10 is a schematic block diagram of a particular embodiment of a computing device configured to execute any of the methods described herein to determine the presence of an improper reductant present in an exhaust reductant storage tank and/or the failure of the SCR catalyst.

FIG. 10 is a block diagram of a computing device 430 in accordance with an illustrative implementation. The computing device can be used to perform any of the methods or the processes described herein, for example the method 300. In some embodiments, the controller 170 or 270 can include the computing device 430. The computing device 430 includes a bus 432 or other communication component for communicating information. The computing device 430 can also include one or more processors 434 or processing circuits coupled to the bus for processing information.

The computing device 430 also includes main memory 436, such as a random access memory (RAM) or other dynamic storage device, coupled to the bus 432 for storing information, and instructions to be executed by the processor 434. Main memory 436 can also be used for storing position information, temporary variables, or other intermediate information during execution of instructions by the processor 434. The computing device 430 may further include a read only memory (ROM) 438 or other static storage device coupled to the bus 432 for storing static information and instructions for the processor 434. A storage device 440, such as a solid-state device, magnetic disk or optical disk, is coupled to the bus 440 for persistently storing information and instructions. Instructions processing the output signal for providing an indication if an improper reductant is present in the exhaust reductant storage tank and/or a failure of the SCR catalyst can be stored in any one of the main memory 436 and/or storage device 440. In one embodiment, the processor 434 can also be configured to generate a fault code indicating that an improper reductant is present in the exhaust reductant storage tank and/or the SCR catalyst has failed. The fault code can be stored in the main memory 436 and/or the storage device 440.

The computing device 430 may be coupled via the bus 432 to a display 435, such as a liquid crystal display, or active matrix display, for displaying information to a user. In one implementation, the display can include a MIL to indicate to a user that an improper reductant is present in the exhaust reductant storage tank. An input device 442, such as a keyboard or alphanumeric pad, may be coupled to the bus 432 for communicating information and command selections to the processor 434. In another implementation, the input device 442 has a touch screen display 444.

According to various implementations, the processes and methods described herein can be implemented by the computing device 430 in response to the processor 434 executing an arrangement of instructions contained in main memory 436 (e.g., the operations of the method 300). Such instructions can be read into main memory 436 from another non-transitory computer-readable medium, such as the storage device 440. Execution of the arrangement of instructions contained in main memory 436 causes the computing device 430 to perform the illustrative processes described herein. One or more processors in a multi-processing arrangement may also be employed to execute the instructions contained in main memory 436. In alternative implementations, hard-wired circuitry may be used in place of or in combination with software instructions to effect illustrative implementations. Thus, implementations are not limited to any specific combination of hardware circuitry and software.

Although an example computing device has been described in FIG. 10, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system, comprising:
an exhaust reductant storage tank;
a selective catalytic reduction system fluidly coupled to the exhaust reductant storage tank, the selective catalytic reduction system including at least one catalyst;
a catalytic conversion efficiency sensor; and
a controller configured to:
interpret an output signal from the catalytic conversion efficiency sensor indicative of a catalytic efficiency of the catalyst,
filter the output signal using a fast filter to obtain a fast filter response signal,
filter the output signal using a slow filter to obtain a slow filter response signal,
determine if the fast filter response signal exceeds a first threshold,
determine if the slow filter response signal exceeds a second threshold, and
in response to a determination that the fast filter response signal exceeds a first threshold, and the slow filter signal response exceeds a second threshold, provide an indication that an improper exhaust reductant is present in the exhaust reductant storage tank.

2. The aftertreatment system of claim 1, further comprising:
a first oxygen sensor positioned upstream of the selective catalytic reduction system the, the first oxygen sensor generating a first oxygen sensor signal, and
a second oxygen sensor positioned downstream of the selective catalytic reduction system, the second oxygen sensor generating a second oxygen sensor signal,
and wherein the controller is further configured to:
interpret the first oxygen sensor signal,
interpret the second oxygen sensor signal, and
generate the output signal.

3. The aftertreatment system of claim 1, further comprising:
a first NOx sensor positioned upstream of the selective catalytic reduction system, the first NOx sensor generating a first NOx sensor signal, and
a second NOx sensor positioned downstream of the selective catalytic reduction system, the second NOx sensor generating a second NOx sensor signal,
and wherein the controller is further configured to:
interpret the first NOx sensor signal,
interpret the second NOx sensor signal, and
generate the output signal.

4. The aftertreatment system of claim 1, further comprising:
an ammonia sensor positioned downstream of the SCR system, the ammonia sensor generating the output signal.

5. The aftertreatment system of claim 1, wherein the controller is further configured to:
in response to a determination that the fast filter response signal does not exceed a first threshold, and the slow filter response signal exceeds a second threshold, provide an indication that the catalyst has failed.

6. The aftertreatment system of claim 1, wherein the providing the indication includes:
generating a fault code indicative of the presence of the improper reductant in the exhaust storage tank; and
storing the fault code on a computer readable medium accessible by a user.

7. The aftertreatment system of claim 1, wherein the providing the indication includes lighting a malfunction indicator lamp.

8. A control module, comprising:
a receiving module configured to receive an output signal from a catalytic conversion efficiency sensor indicative of a catalytic efficiency of a catalyst of a selective catalytic reduction system included in an aftertreatment system;
a first filter module configured to filter the output signal using a first filter and generate a first filter response signal;
a second filter module configured to separately filter the output signal using a second filter and generate a second filter response signal, the second filter having a distinct response time from the first filter; and
a determination module, configured to:
interpret the first filter response to determine if the first filter response signal exceeds a first threshold,
interpret the second filter response signal to determine if the second filter response signal exceeds a second threshold, and
in response to the first filter response signal exceeding the first threshold and the second filter response signal exceeding the second threshold, indicate that an improper reductant is inserted into the selective catalytic reduction system.

9. The control module of claim 8, wherein the indicating includes:
generating a fault code indicative of the presence of an improper exhaust reductant in the exhaust reductant storage tank; and
storing the fault code on a computer readable medium accessible by a user.

10. The control module of claim 8, wherein the indicating includes lighting a malfunction indicator lamp.

11. The control module of claim 8, wherein the aftertreatment system comprises:
a first oxygen sensor positioned upstream of the selective catalytic reduction system, the first oxygen sensor generating a first signal, and
a second oxygen sensor positioned downstream of the selective catalytic reduction system, the second oxygen sensor generating a second signal,
wherein, the receiving module is configured to:
receive each of the first oxygen sensor signal and the second oxygen sensor signal, and
generate the output signal corresponding to the catalytic efficiency of the catalyst.

12. The control module of claim 8, wherein the aftertreatment system comprises:
a first NOx sensor positioned upstream of the selective catalytic reduction system, the first NOx sensor generating a first NOx sensor signal, and
a second NOx sensor positioned downstream of the selective catalytic reduction system, the second oxygen sensor generating a second NOx sensor signal,
wherein, the receiving module is configured to:
receive each of the first NOx sensor signal and the second NOx sensor signal, and
generate the output signal corresponding to the catalytic efficiency of the catalyst.

13. The control module of claim 8, wherein the determination module is further configured to:
indicating a failure of a catalyst included in the selective catalytic reduction system responsive to the first filter response not exceeding the first threshold, and the second filter response exceeding the second threshold.

14. The control module of claim 8, wherein the first filter comprises a fast filter, and wherein the second filter comprises a slow filter.

15. The control module of claim 14, wherein the fast filter has a time constant in the range of 10 milliseconds to 800 milliseconds.

16. The control module of claim 15, wherein the slow filter has a time constant in the range of 30 milliseconds to 1000 milliseconds.

17. The control module of claim 14, wherein the fast filter has a time constant in the range of 1 second to 90 seconds.

18. The control module of claim 17, wherein the slow filter has a time constant in the range of 2 seconds to 100 seconds.

19. The control module of claim 14, wherein a ratio between the response time of the fast filter and the slow filter is in the range of 1.1:1 to 10:1.

20. The control module of claim 19, wherein the ratio between the response time of the fast filter and the slow filter is 6:1.

21. A non-transitory computer readable medium for identifying the presence of an improper exhaust reductant in an exhaust reductant storage tank fluidly coupled to a selective catalytic reduction system of an aftertreatment system, having instructions stored thereon that, when executed by a computing device, cause the computing device to perform operations, comprising:
interpreting an output signal from a catalytic conversion efficiency sensor indicative of a catalytic efficiency of a catalyst included in the selective catalytic reduction system;
filtering the output signal using a first filter to obtain a first filter response signal;
filtering the output signal using a second filter to obtain a second filter response signal, the second filter having a distinct response time from the first filter;
interpreting the first filter response signal to determine if the first filter response signal exceeds a first threshold,
interpreting the second filter response signal to determine if the second filter response signal exceeds a second threshold, and
in response to the first filter response signal exceeding the first threshold and the second filter response signal exceeding the second threshold, indicating that an improper reductant is stored in the selective catalytic reduction system.

22. The non-transitory computer readable medium of claim 21, further comprising:
indicating a failure of a catalyst included in the selective catalytic reduction system responsive to the first filter response signal not exceeding the first threshold, and the second filter response signal exceeding the second threshold.

23. The non-transitory computer readable medium of claim 21, wherein the first filter includes a fast filter, and wherein the second filter includes a slow filter.

24. The non-transitory computer readable medium of claim 23, wherein the fast filter has a time constant in the range of 10 milliseconds to 800 milliseconds.

25. The non-transitory computer readable medium of claim 24, wherein the slow filter has a time constant in the range of 30 milliseconds to 1000 milliseconds.

26. The non-transitory computer readable medium of claim 23, wherein a ratio between the response time of the fast filter and the slow filter is in the range of 1.1:1 to 10:1.

27. The non-transitory computer readable medium of claim 26, wherein the ratio between the response time of the fast filter and the slow filter is 6:1.

28. The non-transitory computer readable medium of claim 23, wherein the fast filter has a time constant in the range of 1 second to 90 seconds.

29. The non-transitory computer readable medium of claim 28, wherein the slow filter has a time constant in the range of 2 seconds to 100 seconds.

* * * * *